(12) United States Patent
Medard et al.

(10) Patent No.: US 6,201,870 B1
(45) Date of Patent: Mar. 13, 2001

(54) PSEUDORANDOM NOISE SEQUENCE GENERATOR

(75) Inventors: Muriel Medard, Lexington; John D. Moores, Concord; Katherine L. Hall, Westford; Kristin A. Rauschenbach, Lexington; Salil Parikh, Burlington; Agnes H. Chan, Lincoln, all of MA (US)

(73) Assignees: Massachusetts Institue of Technology, Cambridge; Northeastern University, Boston, both of MA (US)

( * ) Notice: Subject to any disclaimer, the term of this patent is extended or adjusted under 35 U.S.C. 154(b) by 0 days.

(21) Appl. No.: 09/036,234

(22) Filed: Mar. 6, 1998

Related U.S. Application Data

(60) Provisional application No. 60/042,705, filed on Mar. 20, 1997.

(51) Int. Cl.$^7$ .................................................. H04L 9/00
(52) U.S. Cl. ........................ 380/46; 380/44; 380/263; 380/265; 380/268; 714/728; 377/73; 377/81; 331/78
(58) Field of Search ........................... 380/263, 265, 380/268, 44, 46; 377/73, 81; 331/78; 704/226; 714/728

(56) References Cited

U.S. PATENT DOCUMENTS

| | | | |
|---|---|---|---|
| 3,681,708 | * | 8/1972 | Olmstead ........................... 331/78 |
| 3,751,648 | * | 8/1973 | Wu ................................... 235/152 |
| 3,761,696 | * | 9/1973 | Russell ............................. 235/152 |
| 3,777,278 | * | 12/1973 | Majeau et al. ................... 331/78 |
| 3,946,215 | * | 3/1976 | May .................................. 235/152 |
| 3,947,634 | * | 3/1976 | Betts ................................ 178/69.5 |
| 4,202,051 | * | 5/1980 | Davida et al. .................... 375/2 |
| 4,536,881 | | 8/1985 | Kasuya .............................. 377/70 |
| 4,590,601 | * | 5/1986 | Beeman ........................... 375/115 |
| 4,734,921 | | 3/1988 | Glangano et al. ................ 377/72 |
| 4,905,176 | * | 2/1990 | Schultz ............................. 364/717 |
| 5,111,416 | | 5/1992 | Harada ............................. 364/717 |
| 5,195,136 | * | 3/1993 | Hardy et al. ..................... 380/43 |
| 5,208,705 | * | 5/1993 | Avramopoulos et al. ........ 359/173 |
| 5,235,423 | * | 8/1993 | Dunbar et al. ................... 358/160 |
| 5,268,949 | | 12/1993 | Watanabe et al. ............... 377/33 |
| 5,446,683 | | 8/1995 | Mullen et al. ................... 364/717 |
| 5,506,796 | * | 4/1996 | Ishida ............................... 364/717 |
| 5,566,099 | * | 10/1996 | Shimada .......................... 364/717 |
| 5,608,802 | * | 3/1997 | Alvarez ............................ 380/50 |

FOREIGN PATENT DOCUMENTS

| | | |
|---|---|---|
| 0 438 322 A2 | 7/1991 | (EP) . |
| WO 88/04097 | 6/1988 | (WO) . |

OTHER PUBLICATIONS

Brynielsson, Lennart, "On the linear complexity of combined shift register sequences", Fst/TSA, Box 80001, S–10450, Stolkholm, Sweden, pp. 156–160, (1986).

(List continued on next page.)

*Primary Examiner*—Tod R. Swann
*Assistant Examiner*—Paul E. Callahan
(74) *Attorney, Agent, or Firm*—Fish & Richardson P.C.

(57) ABSTRACT

A pseudorandom sequence generator including a first feedback shift register having at least one input and at least one output and a first controller having an output in communication with the at least one input of the first feedback shift register; the first feedback shift register operating at a first speed $S_1$ and the first controller operating at a second speed $S_2$. In one embodiment the first speed $S_1$ of the first feedback shift register is an integer multiple of the second speed $S_2$ of the first controller. In another embodiment the first feedback shift register includes a shift register having an input, an output, and at least one tap; and a feedback function generator having a first input in communication with the at least one tap of the shift register, a second input in communication with the output of the first controller, and an output in communication with the input of the shift register; the feedback function generator includes at least one feedback function.

38 Claims, 7 Drawing Sheets

OTHER PUBLICATIONS

Chan et al., "Reconfigurable feedback shift registers", ISIT, 1997.

Gollmann, Dieter, "Pseudo Random Properties of Cascade Connections of Clock Controlled Shift Registers", Lecture Notes in Computer Science, vol. 209, pp. 93–98, 1985.

Gollmann, D, "Transformation matrices of clock–controlled shift registers", Cryptography and Coding III, pp. 197–210, 1993.

Jennings, S.M., "Multiplexed Sequences: some properties of the minimum polynomial", Racal Research Ltd., Worton Grange Industrial Estate, Reading, Berks. RG2 OSB, England, pp. 189–206 (1983).

Park, S–J et al., "On the security of the Gollmann cascades", Crypto, pp. 148–156 (1995).

Roggeman, Yves, "Remarks on the auto–correlation function of binary periodic sequences", Cryptologia, vol. 10, No. 2, pp. 96–101, Apr. 1986.

Roggeman, Yves, "Varying feedback shift registers", Eurocrypt '89, Springer–Verlag, pp. 670–679 (1990).*

Rueppel et al., "Products of linear recurring sequences with maximum complexity", IEEE Transactions on Information Theory, vol. IT–33, No. 1 pp. 124–131, Jan., 1987.*

Siegenthaler, T, "Correlation–immunity of non–linear combining functions for cryptographic applications", IEEE Transactions on Information Theory, vol. IT–30, No. 5, pp. 776–780, Sep. 1984.*

Wakerly, J. *Digital Design Principles and Practices*, Prentice Hall, Englewood Cliffs, N.J., pp. 484–486, 1990.*

Zierler et al., "Products of linear recurring sequences", Journal of Algebra, vol. 27, pp. 147–157, 1973.*

* cited by examiner

PSEUDORANDOM NOISE SEQUENCE GENERATOR

PRIORITY INFORMATION

This application claims the benefit of U.S. Provisional Application No. 60/042,705, filed on Mar. 20, 1997.

STATEMENT REGARDING FEDERALLY SPONSORED RESEARCH

This invention was made with government support under AF Contract Number F19628-95C-0002. The U.S. Government has certain rights in the invention.

FIELD OF THE INVENTION

The invention relates generally to communications systems and more specifically to pseudorandom sequence generators used in communications systems.

BACKGROUND OF THE INVENTION

Modern communications systems are highly interconnected with many different users executing different applications on different types of networks which are in communication. With the advanced technology, the transfer of large files rapidly over such systems is made possible using high-speed optical and electronic networks. When such files contain proprietary or personal information, there is an increased need to encrypt the data streams to ensure their integrity and security. Thus, as technology for 100 gigabit per second (Gbps) or above networks comes into widespread use, the demand for cost-effective, ultrafast data stream encryption generators becomes more urgent.

Typically, such encryption systems generate an encrypted data stream by modulating an input data stream with a pseudorandom sequence of bits. Unfortunately, at such high speeds, the generation of these pseudorandom sequences used to encrypt (or encode, if the generator is public) such data is typically extremely expensive and difficult with current high speed electronic encryption systems. Typically such systems operate with a throughput of less than 10 Gbps.

The present invention relates to a feedback shift register useful as a pseudorandom sequence generator for an encryption or encoding system capable of operating at these high data transmission rates.

SUMMARY OF THE INVENTION

In one embodiment the invention relates to a pseudorandom sequence generator including a first reconfigurable feedback shift register having at least one input and at least one output and a first controller having an output in communication with the at least one input of the first feedback shift register. The first feedback shift register operates at a first speed $S_1$ and the first controller operates at a second speed $S_2$. In another embodiment the first speed $S_1$ of the first feedback shift register is an integer multiple of the second speed $S_2$ of the first controller.

In another embodiment the invention relates to a pseudorandom sequence generator in which a first reconfigurable feedback shift register includes a feedback shift register having an input, an output, and at least one tap, and a feedback function generator having a first input in communication with the at least one tap of the shift register, a second input in communication with the output of a first controller, and an output in communication with the input of the feedback shift register. The feedback function generator includes at least one feedback function. In another embodiment the feedback shift register has a length L, the first controller generates a first sequence having a period $\tau$, and the feedback shift register outputs a pseudorandom sequence at the output of the shift register. The pseudorandom sequence has a period substantially equal to $\tau \cdot (S_1/S_2) \cdot (2^L - 1)$.

In yet another embodiment, the invention relates to a pseudorandom sequence generator in which a first controller further includes a second controller having an output, and a second feedback shift register having at least one input in communication with the output of the second controller and at least one output. The second feedback shift register operates at a third speed $S_3$ and the second controller operates at a fourth speed $S_4$.

In another embodiment, the invention relates to a pseudorandom sequence generator which includes a non-linear feedforward function generator having an input in communication with at least one output of a first feedback shift register and an output.

In another embodiment the invention relates to a pseudorandom sequence generator which includes a first sequence generator, a second sequence generator and an interleaver. The first sequence generator has an output and includes a first feedback shift register having at least one input and at least one output and operating at a first speed $S_1$, and a first controller having an output in communication with the at least one input of the first feedback shift register. The first controller operates at a second speed $S_2$. The second sequence generator includes a second feedback shift register having at least one input and at least one output and a second controller having an output in communication with said at least one input of said second feedback shift register. The second feedback shift register operates at a third speed $S_3$ and the second controller operates at a fourth speed $S_4$. The interleaver includes a first input in communication with the output of the first feedback shift register, a second input in communication with the output of said second feedback shift register, and an output.

In still yet another embodiment the invention relates to a communication system, including a first feedback shift register, a first controller, a modulator, a second feedback shift register, a second controller and a demodulator. The first feedback shift register has at least one input, and at least one output and operates at a first speed $S_1$. The first controller has an output in communication with the at least one input of the first feedback shift register and operates at a second speed $S_2$. The modulator has a first input in communication with the at least one output of the first feedback shift register, a second input for an input signal, and an output in communication with a communications link. The demodulator includes one input in communication with the communications link, an output for recovering the input data stream and a second input. The second feedback shift register has at least one input, and at least one output in communication with the second input of the demodulator. The second feedback shift register operates at the first speed $S_1$. The second controller has an output in communication with the at least one input of the second feedback shift register and operates at the second speed $S_2$.

In another embodiment the invention relates to a method of producing a pseudorandom sequence. The method includes the steps of providing a reconfigurable feedback shift register having at least one input and at least one output and a controller having an output in communication with the at least one input of the reconfigurable feedback shift register. The method also includes the steps of operating the controller at a first speed $S_1$, operating the feedback shift register at a second speed $S_2$ and controlling the reconfigurable feedback shift register with the controller. In one embodiment the method includes the step of operating said feedback shift register at the second speed $S_2$ equal to $\delta$ times the first speed $S_1$ of the controller; $\delta$ being an integer greater than or equal to 2.

BRIEF DESCRIPTION OF THE DRAWINGS

The foregoing and other objects, features and advantages of the invention will become apparent from the following more particular description of preferred embodiments of the invention, as illustrated in the accompanying drawings.

DESCRIPTION OF THE PREFERRED EMBODIMENT

Figure 1:
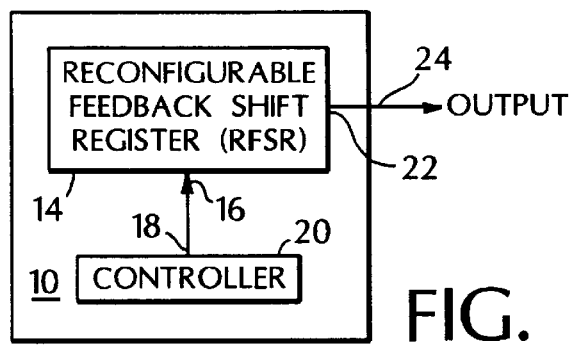
FIG. 1 is a block diagram of an embodiment of a pseudorandom sequence generator of the invention.

In brief overview and referring to FIG. 1, one embodiment of a pseudorandom sequence generator of the invention 10, includes a reconfigurable feedback shift register (RFSR) 14 which includes an input port 16 in communication with an output port 18 of a controller 20. The output port 22 of the RFSR 14 is the output port 24 of the pseudorandom sequence generator 10. In operation in one embodiment the output port 24 of the pseudorandom sequence generator 10 is in communication with one input of a modulator or demodulator. A pseudorandom sequence for the purpose of this disclosure is a periodic binary sequence of long period with approximately equal number of 1s and 0s whose runs have frequency which approximates a Bernoulli distribution. For a shift register length L, long would be significantly greater than $2^L-1$, which is the maximum achievable period for a linear feedback shift register without reconfiguration.

Figure 2:
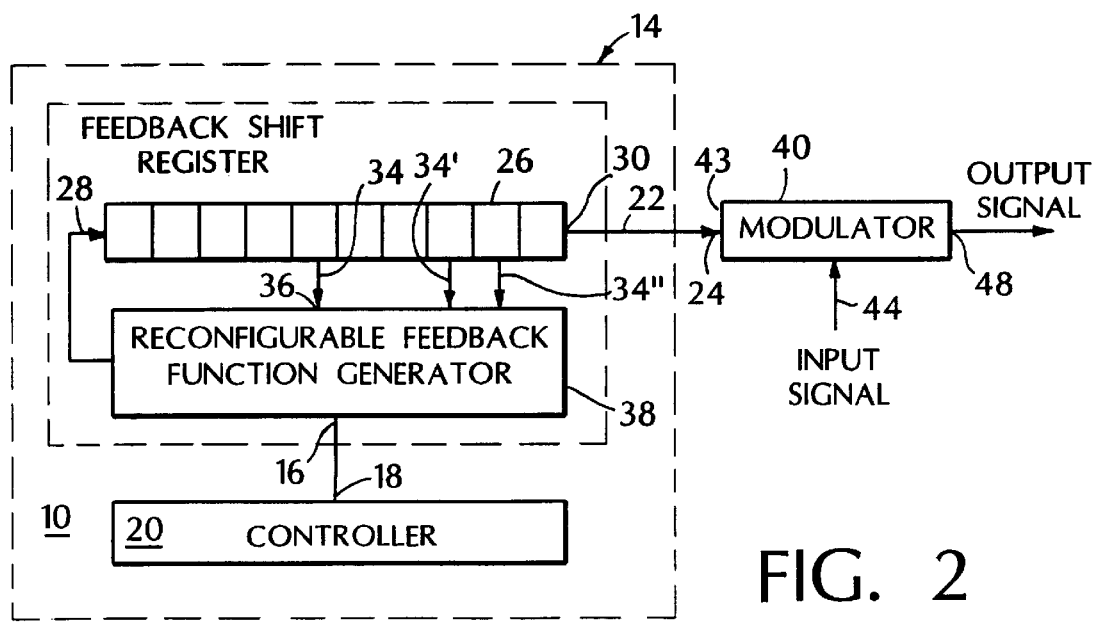
FIG. 2 is a block diagram of an embodiment of the pseudorandom sequence generator of FIG. 1 used in conjunction with a modulator.

In more detail and referring to FIG. 2, the RFSR 14 includes a feedback shift register (SR) 26, which includes an input port 28 and an output port 30 which is the output port 22 of the RFSR 14 and the output port 24 of the pseudorandom sequence generator 10. The SR 26 also includes at least one tap 34, 34', 34" (generally 34) each of which is in communication with an input port (generally 36) of a reconfigurable feedback function generator (RFFG) 38. The RFFG 38 also includes a control port which is the input port 16 of the RFSR 14 and which is connected to the output port 18 of the controller 20. In the embodiment shown, the output port 24 of the pseudorandom sequence generator 10 is in communication with an input port 43 of a modulator 40. A second input port 44 of the modulator 40 is in communication with an input signal source (not shown). An encrypted or encoded or modulated output signal appears at the output port 48 of the modulator 40.

In this embodiment the RFFG 38 has a characteristic polynomial which is determined by the controller 20. The RFFG 38 uses a characteristic polynomial which is either linear or non-linear. For high speed optical generation of a pseudorandom sequence, the SR 26 is an optical device having L registers, where typically $L \geq 10^6$. Typically, owing to the constraints on the cost and available technology, the number of taps for the FSR 14 is N, where N is considerably smaller than L. If $s=(s_0, s_1, \ldots, s_\rho)$ denotes the binary output sequence at output port 30 where $\rho$ is the period of the output sequence, the number of bits until the pseudorandom sequence repeats, then the sequence term $S_{i+L}$ satisfies the recurrence relation given in equation (1).

$$s_{i+L} = \sum_{0 \leq i_1 \leq i_2 \leq \ldots \leq L-1} a_{i_1 i_2 \ldots i_n} s_{i_1+i} s_{i_2+i} \cdots s_{i_N+i} \quad (1)$$

Equivalently, the feedback function $f(x_0, \ldots, x_{L-1})$ as determined by the taps to the RFFG and the input from the controller 20, can be written as $$f(x_0, \ldots, x_{L-1}) = \sum_{0 \leq i_1 \leq i_2 \leq \ldots \leq L-1} a_{i_1 i_2 \ldots i_n} x_{i_1} x_{i_2} \cdots x_{i_N} \quad (2)$$

In this configuration, if the feedback function remains the same throughout the generation of the sequence, it is relatively easy to solve for the N nonzero coefficients of the feedback function f, thereby reducing the security of the sequence. Therefore, for increased security different feedback functions are used and the feedback shift register is therefore reconfigurable.

Figure 2A:
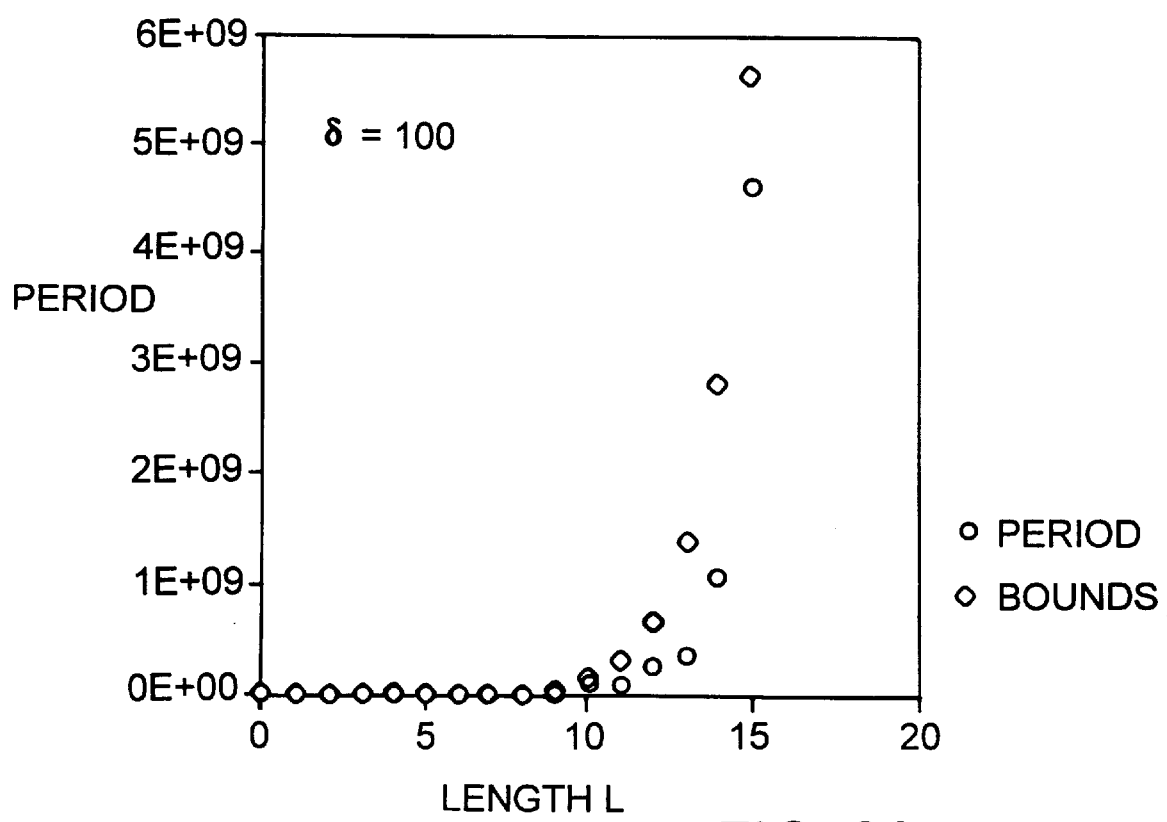
FIG. 2a shows a graph of period versus length of the controlled feedback shift register for an embodiment of the reconfigurable feedback shift register shown in FIG. 2.

Let $f_0, f_1, \ldots, f_\tau$ be feedback functions, each of which has at most N nonzero terms. The RFSR 14 outputs a sequence bit at every shift register clock cycle according to the feedback functions $f_i$, and its taps 34 are reconfigured every $\Delta$ clock cycles according to the output symbol of the controller 20. The $\Delta$ clock cycles may be varying. Specifically, if the output symbol of the controller 20 is i, then the feedback function generating the output sequence bit is given by $f_i(x_0, \ldots, x_{L-1})$ where $(x_0, \ldots, X_{L-1})$ is the current content of the SR 26. The reconfiguration interval $\Delta$ has to be at least $\delta$, where $\delta$ is the ratio of the data rate at which the RFSR 14 operates to the data rate at which the controller 20 operates. For example, if the optical rate of the RFSR 14 is 100 Gbps and an electronic rate of the controller 20 is 5 Gbps, $\delta$ will be 20. FIG. 2a is a graph of how the period varies with the length L for $\delta$ equal to 100 in a RFSR which is being reconfigured by a RFFG which selects between 2 quadratic functions.

Although such reconfigurability increases the effort of cryptanalysis by opponents, the use of a simple, deterministic function controlling the reconfigurable feedback functions will result in sequences as vulnerable as those without reconfigurability. This is because an opponent can simply partition the sequence into sections of length Δ and analyze sections that correspond to the feedback function $f_i$ according to the controlling sequence. It is therefore important to introduce a controlling function that generates strong pseudorandom sequences.

Figure 3:
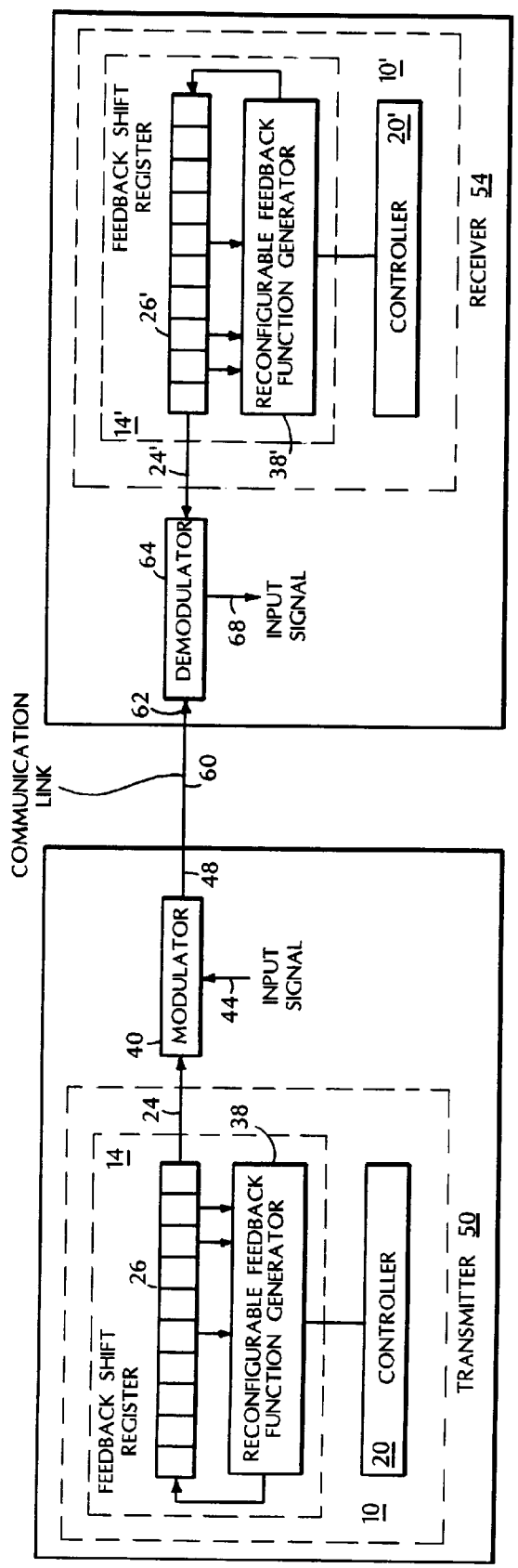
FIG. 3 is a block diagram of an embodiment of a communications system utilizing the embodiment of the pseudorandom sequence generator shown in FIG. 2.

An embodiment of a communications system constructed in part with the pseudorandom sequence generator 10 of the invention is depicted in FIG. 3. In this embodiment a transmitter 50 is in communication with a receiver 54 over a communications link 60. As discussed previously, an input data signal is applied to an input port 44 of a modulator 40 while a pseudorandom sequence is applied to a second input port 43 of the modulator 40. The pseudorandom sequence is generated by a pseudorandom sequence generator 10, which is part of the transmitter 50, as discussed previously. The modulator 40 produces an encrypted or encoded or modulated data output signal at its output port 48, and hence over the communications link 60, that is a function of the pseudorandom sequence and the input data signal. Whether the data is encoded or encrypted or modulated depends upon whether the controller is publicly known or secure.

The encrypted or encoded or modulated data output signal is received from the communications link 60 at one input 62 of a demodulator 64. The other input 24' to the demodulator is in communication with a pseudorandom sequence generator 10' which is part of the receiver 54 and which generates the same pseudorandom sequence as the pseudorandom sequence generator 10 of the transmitter 50, as described above. The demodulator 64 uses the pseudorandom sequence to perform an inverse operation to that performed by the modulator so as to extract the input data stream from the encrypted or encoded or modulated data stream transmitted by the transmitter 50 and to place the unencoded or unencrypted data stream at its output 68. It should be noted that synchronization is required for both encryption/decryption or modulation/demodulation.

Figure 4:
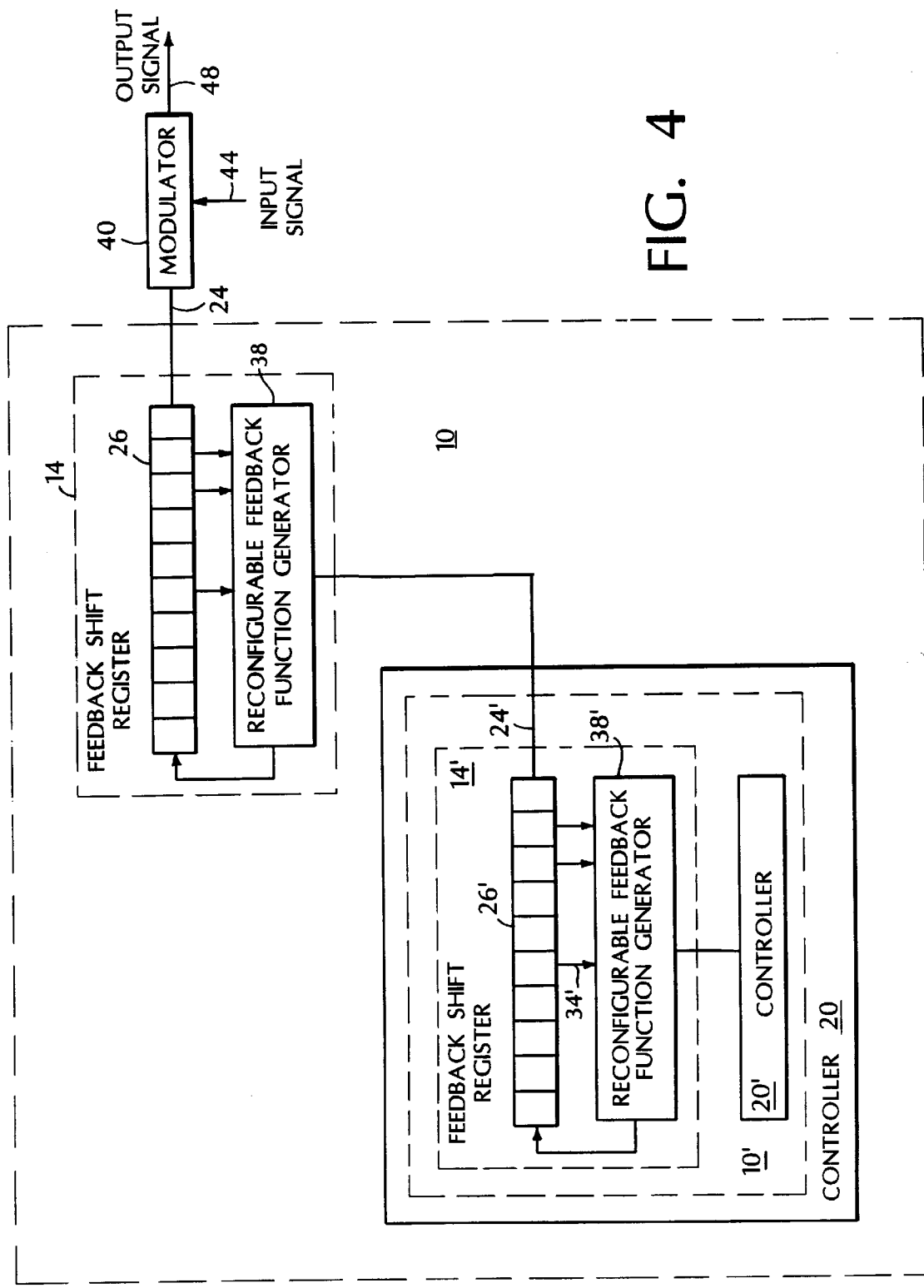
FIG. 4 is a block diagram of an embodiment of a pseudorandom sequence generator of the invention having an embodiment of a pseudorandom sequence generator as a controller.

In another embodiment (FIG. 4), the controller 20 of the RFSR 14 in the pseudorandom sequence generator 10, is itself a pseudorandom sequence generator. In this embodiment the pseudorandom sequence generator 10', as discussed previously, includes a controller 20' which provides an input signal to a RFFG 38'. The output sequence from the RFFG 38' is an input signal to a SR 26' whose taps 34'" provide a second input signal to the RFFG 38'. The pseudorandom sequence from the RFSR 14' is the control signal to the RFFG 38 of the RFSR 14. In this way, the characteristic polynomial of the RFFG 38 is controlled by the pseudorandom sequence of the pseudorandom sequence generator 20.

Figure 5:
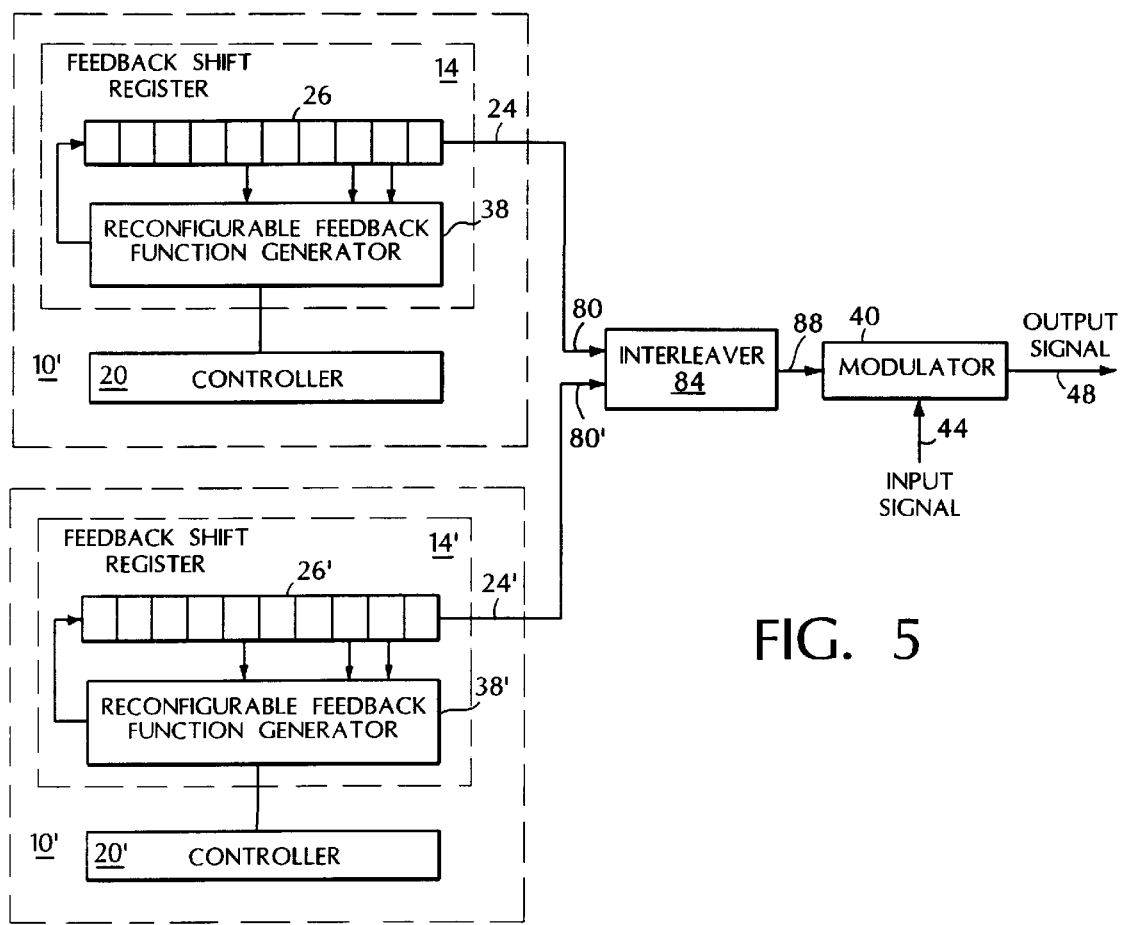
FIG. 5 is a block diagram of an embodiment of a pair of pseudorandom sequence generators of the invention used with an interleaver.

FIG. 5 depicts another embodiment of the invention in which the pseudorandom sequences generated by two pseudorandom sequence generators 10, 10' each including a controller 20, 20', respectively, and a RFSR 14, 14', respectively. Each pseudorandom sequence generator 10, 10' generates a pseudorandom sequence, as discussed above, and places the sequence at its output port 24, 24' respectively. Each output port 24, 24' of the pseudorandom sequence generators 10, 10', respectively, is connected to a respective input port 80, 80' of an interleaver 84. The interleaver 84 combines the pseudorandom sequences by interleaving in a constant or time-varying fashion the data bits of each sequence and places the combined sequences at its output port 88. The output port 88 of the interleaver 84 is in communication with one input port 43 of a modulator 40. As discussed previously, the modulator 40 combines an input data stream at its other input port 44 to produce the encoded or encrypted or modulated data stream at its output port 48.

Figure 6:
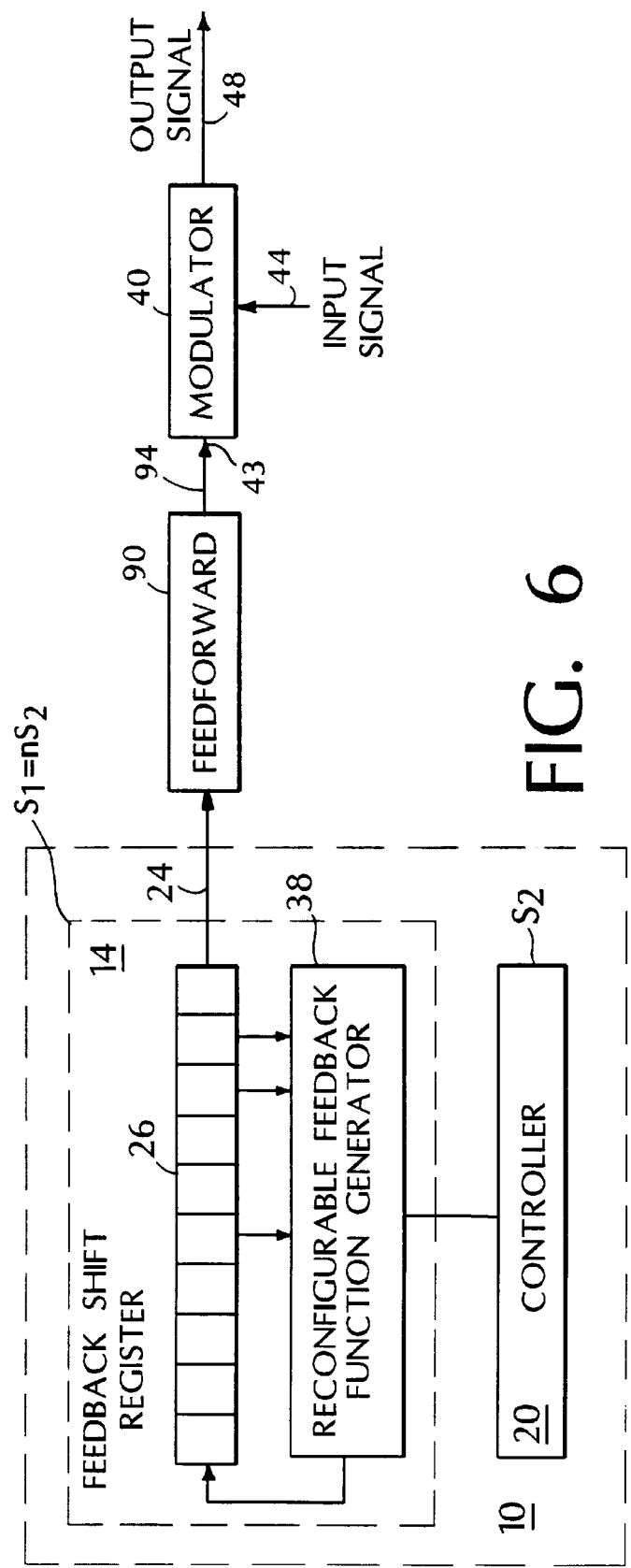
FIG. 6 is a block diagram of an embodiment of the pseudorandom sequence generator of the invention used with a feedforward device.

In another embodiment (FIG. 6), in order to add complexity to the output sequence, the output port 24 of the pseudorandom sequence generator 10 is in communication with the input port of a feedforward function device 90. The feedforward device 90 receives the output sequence from the pseudorandom sequence generator 10 and applies a feedforward operation on it. This operation may be performed one bit at a time or on a sequence of bits. The output port 94 of the feedforward device 90 is in communication with an input port 42 of the modulator 40. The application of the feedforward function to the output bit stream is controlled by a controller running at a clock rate which may be slower than the pseudorandom sequence generator 10 produces bits at its output. The feedforward operation may involve the flipping of bits and/or the exchange of two bits separated by a given distance (number of bits).

Figure 7:
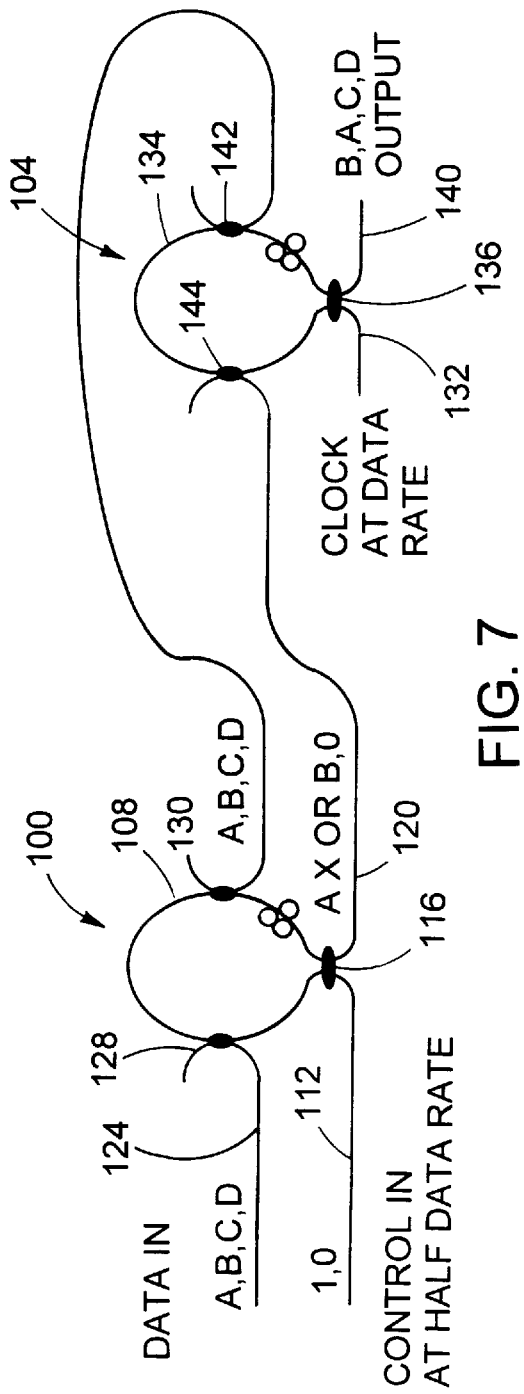
FIG. 7 is a highly schematic diagram of an optical embodiment of a bit exchanger for use with an embodiment of the pseudorandom sequence generator of the invention.

If it is desired simply to exchange two bits, no exchange need occur unless the bits are different. That is, the bit pattern 00 is identical to the pattern with the bits exchanged. The same is true of the pattern 11. Therefore, if the incoming bits which are to be exchanged are designated as A and B then such an exchange need only occur if A XOR B=1. An example of an embodiment of an optical feedforward device 90 which will exchange two bits is shown in FIG. 7.

In this embodiment two optical switches or gates 100, 104 in the form of non-linear optical loop mirrors (NOLMs) are cascaded. The first NOLM 100 includes a loop of optical fiber 108 which is coupled to an input fiber 112 having an optical control stream of bits by way of a 50:50 coupler 116. The coupler 116 also couples the loop 108 to the output optical fiber 120. The data stream whose order is to be changed is input to the loop 108 by way of a data stream optical fiber 124 which is coupled to the loop 108 by a second optical coupler. In this configuration the first NOLM 100 is configured as an AND gate with the data stream and the control stream as inputs. This optical AND gate has two outputs: the unaffected data stream, which exits the loop through a third coupler 130 and the product of the control stream with the XOR function of each pair of bits which exits the loop 108 through the output fiber 120 by way of coupler 116. The control stream selects which pair of bits should be XOR'd and the XOR function determines if the exchange is required.

In this configuration, the control pulse clock rate is half of the data stream clock rate and a ONE in the control stream indicates that the order of a pair of data bits is to be reversed. The product of the XOR function and the control stream is also at half of the data rate, and is used as a secondary control stream to initiate the bit reversal in the second gate or 104. The second gate 104 is configured as a NOLM 104 and is functionally equivalent to the first NOLM 100. One input 132 is coupled to the loop 134 through a 50:50 coupler 136 is a clock pulse sequence at the input 124 data rate. The signal at the output 140 is the result of XORing the data stream entering the loop 134 by way of coupler 142 from coupler 130 of NOLM 100 with the secondary control stream entering the loop 134 by way of coupler 144 from the output 120 of 50:50 coupler 116 of NOLM 100.

In more detail, in this configuration, the first NOLM 100 is a "walk-through" switch, in which the control bits or pulses from the input fiber 112 are distinct from the data bits or pulses in some way, such as in polarization or wavelength. The 50:50 couplers 128, 130 operate in different ways on the data and control bits. For example, if the data and control pulses are orthogonally polarized, the couplers 128, 130 in one embodiment are polarization-beamsplitting couplers in order to separate the data and control pulses. The length of the loop 108 is selected such that the time required for each control bit to circulate the loop 108 differs from the circulation time of a data bit by approximately 2 data bit intervals. This difference in relative velocity of the data and control pulses arises from birefringence in the case of orthogonally polarized streams. Such a difference in relative velocity may also arise because of dispersion if the control and data pulses have different wavelengths.

Furthermore, the optical power, relative speed, and loop length are chosen so that the nonlinear interaction between one data pulse and one half control pulse gives rise to a π radian phase shift to a half control pulse. For the purpose of explanation (FIG. 7) it is assumed that the data and control streams are synchronized so that the "ZERO" bit of the control stream walks through the C and D data pulses, and the "ONE" control bit walks through the A and B data pulses. Then, assuming, in the embodiment shown, that the NOLM switch 100 is biased so that control bits are normally reflected back out through the input fiber 112, then the results appearing at the output 120 will be logically equivalent to the XOR function of the pairs of data bits multiplied by the control bits. In the example shown, the first output bit is "ZERO", because the first control bit is "ZERO", and the second output bit is A XOR B, because the second control bit is "ONE".

The second NOLM 104 is also designed for "walk-through". The second NOLM 104 XORs the data bits and the secondary control bits from output 120. In this embodiment, the input pulses from 142 are transmitted at the data rate as are the clock pulses from 132. The input pulses from 144 are input at half the data rate. As a result, each input pulse from 144 interacts with 2 clock pulses while each pulse from 142 interacts with 1 clock pulse. In the example shown, the output is A XOR (A XOR B), B XOR (A XOR B), C XOR 0, D XOR 0, which simplifies to the bit pattern B, A, C, D being produced at the output fiber 140 of NOLM 104. Although the description to this point has been limited to optical fiber NOLMs as switches or gates, the same functions could be implemented using semiconductor optical logic gates, for example in a fully integrated package.

Figure 8:
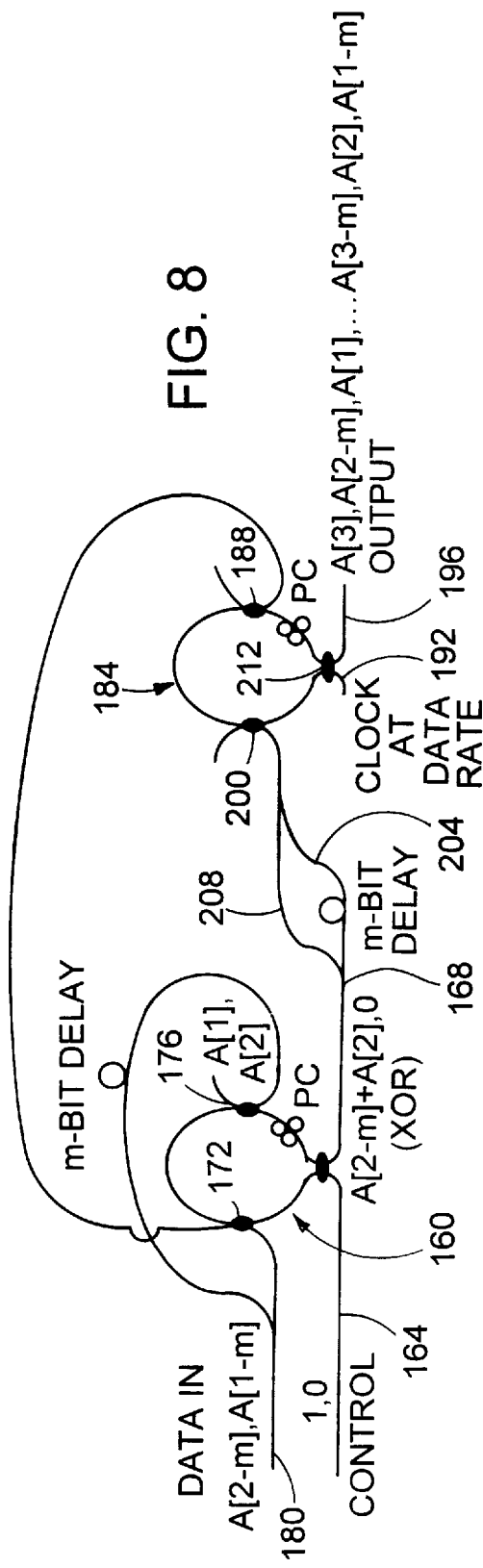
FIG. 8 is a highly schematic diagram of another optical embodiment of a bit exchanger for use with an embodiment of the pseudorandom sequence generator of the invention.

FIG. 8 depicts another fiber implementation of a bit exchanger that exchanges bits that are separated by m bits. As discussed with respect to FIG. 7, in this embodiment the switches or gates are NOLMs. The first NOLM 160 includes a control input fiber 164 as described previously, and an output fiber 168, also as described previously. Data enters the NOLM 160 through two 50:50 couplers 172, 176. Data to one coupler 176 is delayed slightly with respect to the other coupler due to the extra length of fiber carrying the data from the input fiber 180 to the coupler 176. In this configuration, the incoming data and the delayed copy are XORed together. The incoming data is also the input to a second NOLM 184 by way of a coupler 188. In this embodiment this data is taken from one of the couplers 172 for the XOR-inputs to the first logic gate 160, but in other embodiments the data is taken prior to coupler 172.

The second NOLM also includes an input fiber 192 which supplies clock pulses, an output fiber 196 and a second input coupler 200. The output fiber 168 of the first gate 160 is in communications with the second coupler 200 by two paths, one path 204 being m-bit delayed relative to the second path 208. When a control pulse is present on input fiber 164 such that it interacts with one data pulse for example A[2] and delayed pulse A[2-m] on data input fiber 180, then A[2] XOR A[2-m] appears at the output fiber 168. When no control pulse is present, a ZERO appears at the output fiber. The signal at the output fiber 168 of the first gate 160 is then divided into two streams; one stream being delayed by m-bits. The two pulse streams are then combined and enter coupler 200.

The clock stream, all pulses, from the input fiber 192 enters the second gate 184 through the 50:50 coupler 212. When there is no output signal from the first gate 160, the signal on the output fiber 196 of the second gate 184 results from the ANDing of the data stream through coupler 188 and the clock 192. This signal is then simply the data stream.

A control input pulse to the first gate 160 gives rise to two control pulses, offset by m-bits, to the second gate 184, through coupler 200. It is the presence of the control pulse in the second gate 184 which inverts the corresponding output bit. As with the embodiment depicted in FIG. 7, the bit exchange occurs here only when the bits are distinct because of the XORing in the NOLM 160. In another embodiment, each m-bit delay line is replaced by a spatial routing switch followed by several delay lines of different lengths. Such a device exchanges bits separated by m-bits, where m is now a controllable, or reconfigurable, parameter.

While the invention has been particularly shown and described with reference to specific preferred embodiments, it should be understood by those skilled in the art that various changes in form and detail may be made therein without departing from the spirit and scope of the invention as defined by the appended claims.

What is claimed is:

1. A pseudo-noise sequence generator comprising:
   a first reconfigurable feedback shift register having a configuration that is reconfigurable and also having at least one input for reconfiguring said configuration and at least one output for outputting a pseudo-noise sequence, said first reconfigurable feedback shift register operating at a first speed $S_1$; and
   a first controller having an output in communication with said at least one input of said first reconfigurable feedback shift register, said first controller functioning to control the configuration of the first reconfigurable feedback shift register and operating at a second speed $S_2$, that is different from said first speed $S_1$.

2. The pseudo-noise sequence generator of claim 1 wherein the first speed $S_1$ of said first feedback shift register is an integer multiple of the second speed $S_2$ of said first controller.

3. The pseudo-noise sequence generator of claim 1 wherein said first feedback shift register is an optical feedback shift register and said first controller is an electrical controller.

4. The pseudo-noise sequence generator of claim 1 wherein said first feedback shift register is an electrical feedback shift register and said first controller is an electrical controller.

5. The pseudo-noise sequence generator of claim 1 wherein said first feedback shift register is an electrical feedback shift register and said first controller is an optical controller.

6. The pseudo-noise sequence generator of claim 1 wherein said first feedback shift register is an optical feedback shift register and said first controller is an optical controller.

7. The pseudo-noise sequence generator of claim 1 wherein said first feedback shift register is implemented in software and said first controller is an electrical controller.

8. The pseudo-noise sequence generator of claim 1 wherein said first feedback shift register is implemented in software and said first controller is an optical controller.

9. The pseudo-noise sequence generator of claim 1 wherein said first feedback shift register and said first controller are implemented in software.

10. The pseudo-noise sequence generator of claim 1, wherein said first feedback shift register further comprises:
   a shift register having an input, an output, and at least one tap; and
   a feedback function generator having a first input in communication with said at least one tap of said shift register, a second input in communication with said output of said first controller, and an output in communication with said input of said shift register, said feedback function generator comprising at least one feedback function.

11. The pseudo-noise sequence generator of claim 10 wherein said shift register has a length L, said first controller generates a first sequence having a period $\tau$, and said shift register outputs a pseudo-noise sequence at said output of said shift register, the pseudo-noise sequence having a period substantially equal to $\tau \cdot (S_1/S_2) \cdot (2^L - 1)$.

12. The pseudo-noise sequence generator of claim 10 wherein said feedback function generator selects each of said at least one tap in response to a signal from said first controller.

13. The pseudo-noise sequence generator of claim 10 wherein said at least one feedback function generated by said feedback function generator has a characteristic polynomial, said feedback function generator selecting zero or more of said at least one tap for use in generating each symbol of a pseudo-noise sequence in response to the characteristic polynomial.

14. The pseudo-noise sequence generator of claim 10 wherein said at least one feedback function generated by said feedback function generator has a characteristic polynomial, said feedback function generator selecting zero or more of said at least one tap for use in generating each bit of a pseudo-noise sequence in response to the characteristic polynomial.

15. The pseudo-noise sequence generator of claim 14 wherein the number of said taps selected by said feedback function generator is less than or equal to a ratio of the first speed $S_1$ of said first feedback shift register to the second speed $S_2$ of said first controller.

16. The pseudo-noise sequence generator of claim 10 wherein said feedback function generator is reconfigurable.

17. The pseudo-noise sequence generator of claim 16 wherein said feedback function generator further comprises a plurality of feedback functions.

18. The pseudo-noise sequence generator of claim 17 wherein said first controller selects one of said plurality of feedback functions for use in generating each bit of a pseudo-noise sequence.

19. The pseudo-noise sequence generator of claim 10 wherein said first controller further comprises:
   (a) a second feedback shift register having at least one input and at least one output, said second feedback shift register operating at a third speed $S_3$; and
   (b) a second controller having an output in communication with said at least one input of said second feedback shift register, said second controller operating at a fourth speed $S_4$.

20. The pseudo-noise sequence generator of claim 1, further comprising:
   a non-linear feedforward function generator having an input in communication with said at least one output of said first feedback shift register and an output.

21. The pseudo-noise sequence generator of claim 20, wherein said non-linear feedforward function generator is an optical function generator.

22. The pseudo-noise sequence generator of claim 20, wherein said non-linear feedforward function generator is an optical bit exchanger.

23. The pseudo-noise sequence generator of claim 20, wherein said non-linear feedforward function generator performs symbol mapping.

24. The pseudo-noise sequence generator of claim 1 wherein the first speed $S_1$ of said first feedback shift register is equal to $\delta$ times the second speed $S_2$ of said first controller, $\delta$ being an integer greater than or equal to 2.

25. The pseudo-noise sequence generator of claim 24 wherein said first feedback register further comprises: a shift register having an input, an output, and at least one tap; and
   a feedback function generator having a first input in communication with said at least one tap of said shift register, a second input in communication with said output of said first controller, and an output in communication with said input of said shift register, said feedback function generator comprising at least one feedback function;
   wherein said shift register has a length L, said first controller generates a first sequence having a period $\tau$, and said shift register outputs a pseudo-noise sequence at said output of said shift register, the pseudo-noise sequence having a period on the order of $\tau \cdot \delta \cdot (2^L - 1)$.

26. The pseudo-noise sequence generator of claim 25 wherein said feedback function generator selects zero or more of said at least one tap in response to a signal from said first controller, the number of said taps selected by said feedback function generator being less than or equal to $\delta$.

27. A pseudo-noise sequence generator comprising:
   (a) a first sequence generator having an output, said first sequence generator comprising:
      (i) a first reconfigurable feedback shift register having a configuration that is reconfigurable and also having at least one input for reconfiguring said configuration and at least one output, said first reconfigurable feedback shift register operating at a first speed $S_1$; and
      (ii) a first controller having an output in communication with said at least one input of said first reconfigurable feedback shift register, said first controller functioning to control the configuration of the first reconfigurable feedback shift register and operating at a second speed $S_2$ that is different from said first speed $S_1$;
   (b) a second sequence generator having an output, said second sequence generator comprising:
      (i) a second feedback shift register having at least one input and at least one output, said second feedback shift register operating at a third speed $S_3$, and
      (ii) a second controller having an output in communication with said at least one input of said second feedback shift register, said second controller operating at a fourth speed $S_4$; and
   (c) a combiner having a first input in communication with said output of said first sequence generator, a second input in communication with said output of said second sequence generator, and an output for outputting a pseudo-noise sequence.

28. The pseudo-noise sequence generator of claim 27 wherein said combiner is an interleaver.

29. A communication system comprising:
(a) a first reconfigurable feedback shift register having a configuration that is reconfigurable and also having at least one input for reconfiguring said configuration and at least one output, said first reconfigurable feedback shift register operating at a first speed $S_1$;
(b) a controller having an output in communication with said at least one input of said first reconfigurable feedback shift register, said controller functioning to control the configuration of the first reconfigurable feedback shift register and operating at a second speed $S_2$ that is different from said first speed $S_1$;
(c) a modulator having a first input in communication with said at least one output of said first reconfigurable feedback shift register, a second input for an input signal, and an output;
(d) a second feedback shift register having at least one input and at least one output, said second feedback shift register operating at a first speed $S_1$;
(e) a controller having an output in communication with said at least one input of said second feedback shift register, said controller operating at a second speed $S_2$; and
(f) a demodulator having a first input in communication with said at least one output of said second feedback shift register a second input in communication with said output of said modulator, and an output.

30. A transmitter comprising:
(a) a reconfigurable feedback shift register having a configuration that is reconfigurable and also having at least one input for reconfiguring said configuration and at least one output, said reconfigurable feedback shift register operating at a first speed $S_1$;
(b) a controller having an output in communication with said at least one input of said reconfigurable feedback shift register, said controller functioning to control the configuration of the reconfigurable feedback shift register and operating at a second speed $S_2$, that is different from said first speed $S_1$; and
(c) a modulator having a first input in communication with said at least one output of said reconfigurable feedback shift register, a second input for an input signal, and an output.

31. A receiver comprising:
(a) a reconfigurable feedback shift register having a configuration that is reconfigurable and also having at least one input for reconfiguring said configuration and at least one output, said reconfigurable feedback shift register operating at a first speed $S_1$;
(b) a controller having an output in communication with said at least one input of said reconfigurable feedback shift register, said controller functioning to control the configuration of the reconfigurable feedback shift register and operating at a second speed $S_2$, that is different from said first speed $S_1$; and
(c) a demodulator having a first input in communication with said at least one output of said reconfigurable feedback shift register, a second input for an input signal, and an output.

32. A method of producing a signal, comprising the steps of:
(a) providing a reconfigurable feedback shift register having a configuration that is reconfigurable and also having at least one input for reconfiguring said configuration and at least one output;
(b) providing a controller having an output in communication with said at least one input of said reconfigurable feedback shift register;
(c) operating said controller at a first speed $S_1$;
(d) operating said reconfigurable feedback shift register at a second speed $S_2$, that is different from said first speed $S_1$; and
(e) controlling the configuration of said reconfigurable feedback shift register with said controller.

33. The method of claim 32 wherein the step of operating said feedback shift register at the second speed $S_2$ further comprises the step of operating said feedback shift register at a second speed $S_2$ equal to $\delta$ times the first speed $S_1$ of said controller, $\delta$ being an integer greater than or equal to 2.

34. The method of claim 32 wherein the step of providing a controller further comprises the step of providing a secure controller, said method further comprising the steps of:
(f) providing an encryptor having a first input in communication with said at least one output of said feedback shift register, a second input, and an output;
(g) applying a pseudo-noise sequence from said at least one output of said feedback shift register to said first input of said encryptor;
(h) applying an input signal to be encrypted to said second input of said encryptor; and
(i) encrypting said input signal with said pseudo-noise sequence.

35. The method of claim 32 wherein the step of providing a controller further comprises the step of providing a secure controller, said method further comprising the steps of:
(f) providing a decryptor having a first input in communication with said at least one output of said feedback shift register, a second input, and an output;
(g) applying a pseudo-noise sequence from said at least one output of said feedback shift register to said first input of said decryptor;
(h) applying an input signal to be decrypted to said second input of said decryptor; and
(i) decrypting said input signal with said pseudo-noise sequence.

36. The method of claim 32 wherein the step of providing a controller further comprises the step of providing a publicly known controller, said method further comprising the steps of:
(f) providing a modulator having a first input in communication with said at least one output of said feedback shift register, a second input, and an output;
(g) applying a pseudo-noise sequence from said at least one output of said feedback shift register to said first input of said modulator;
(h) applying an input signal to be modified to said second input of said modulator; and
(i) modulating said input signal with said pseudo-noise sequence.

37. The method of claim 32 wherein the step of providing a controller further comprises the step of providing a publicly known controller, said method further comprising the steps of:
(i) providing a demodulator having a first input in communication with said at least one output of said feedback shift register, a second input, and an output;
(g) applying a pseudo-noise sequence from said at least one output of said feedback shift register to said first input of said demodulator;

(h) applying an input signal to be demodulated to said second input of said demodulator; and (i) demodulating said input signal with said pseudo-noise sequence.

38. A pseudo-noise sequence generator comprising:

a first reconfigurable feedback shift register having a configuration that is reconfigurable and also having one input for reconfiguring said configuration, one output and at least one tap, said input in communication with said output and said first feedback shift register operating at a first speed $S_1$; and a first controller having an output in communication with said at least one tap of said first reconfigurable feedback shift register, said first controller operating at a second speed $S_2$, that is different from said first speed $S_1$.

* * * * *

UNITED STATES PATENT AND TRADEMARK OFFICE
CERTIFICATE OF CORRECTION

PATENT NO. : 6,201,870 B1  
DATED : March 13, 2001  
INVENTOR(S) : Muriel Medard, John D. Moores, Katherine L. Hall, Kristin A. Rauschenbach, Salil Parikh, Agnes H. Chan Page 1 of 1

It is certified that error appears in the above-identified patent and that said Letters Patent is hereby corrected as shown below:

<u>Title page,</u>  
References Cited, U.S. PATENT DOCUMENTS,  
5,235,423, "8/1993" should be -- 3/1976 --, and  
"4/1996" should be -- 5/1996 --.

<u>Column 4,</u>  
Line 52, "The A clock" should be -- The $\Delta$ clock --.

Signed and Sealed this

Second Day of April, 2002

Attest:

Attesting Officer

JAMES E. ROGAN  
*Director of the United States Patent and Trademark Office*